(12) United States Patent
Shintani (10) Patent No.: US 8,169,540 B2
(45) Date of Patent: May 1, 2012

(54) COMPACT CAMERA BODY TO WHICH INTERCHANGEABLE LENS UNIT IS MOUNTABLE

(75) Inventor: Dai Shintani, Osaka (JP)

(73) Assignee: Panasonic Corporation, Osaka (JP)

( * ) Notice: Subject to any disclaimer, the term of this patent is extended or adjusted under 35 U.S.C. 154(b) by 317 days.

(21) Appl. No.: 12/552,754

(22) Filed: Sep. 2, 2009

(65) Prior Publication Data

US 2010/0060775 A1 Mar. 11, 2010

(30) Foreign Application Priority Data

Sep. 10, 2008 (JP) .................................. 2008-232069

(51) Int. Cl.
*H04N 5/225* (2006.01)
*G03B 17/02* (2006.01)
(52) U.S. Cl. ........................................ 348/374; 396/535
(58) Field of Classification Search .......... 348/371–376; 396/176, 205, 206, 535–541
See application file for complete search history.

(56) References Cited

U.S. PATENT DOCUMENTS

| 7,525,596 B2 * | 4/2009 | Yamaguchi | 348/375 |
| 2005/0280736 A1 * | 12/2005 | Baba | 348/371 |
| 2008/0193121 A1 * | 8/2008 | Miyazaki | 396/299 |
| 2009/0002541 A1 * | 1/2009 | Niwamae | 348/335 |

FOREIGN PATENT DOCUMENTS

| JP | 10-039388 A | 2/1998 |
| JP | 2001-075158 A | 3/2001 |
| JP | 2003-344944 A | 12/2003 |
| JP | 2006-010743 A | 1/2006 |

* cited by examiner

*Primary Examiner* — Timothy J Henn
(74) *Attorney, Agent, or Firm* — Panasonic Patent Center; Dhiren Odedra; Kerry Culpepper (57) ABSTRACT

A camera body allows the mounting of a lens unit configured to form an optical image of a subject, and includes a body mount, an imaging element, a capacitor, and a housing member. The body mount allows a lens unit to be mounted. The imaging element includes a light receiving face arranged to receive light passing through the lens unit, and converts an optical image of the subject into an electrical signal. The capacitor is disposed above the imaging element and more to the imaging element side than the body mount in a landscape orientation. The housing member accommodates the imaging element and the capacitor.

18 Claims, 6 Drawing Sheets

COMPACT CAMERA BODY TO WHICH INTERCHANGEABLE LENS UNIT IS MOUNTABLE

CROSS-REFERENCE TO RELATED APPLICATIONS

This application claims priority to Japanese Patent Application No. 2008-232069 filed on Sep. 10, 2008. The entire disclosure of Japanese Patent Application No. 2008-232069 is hereby incorporated herein by reference.

BACKGROUND

1. Technical Field

The technical field relates to a camera body to which a lens unit can be mounted, and to an imaging device equipped with this camera body.

2. Description of the Related Art

The single lens reflex camera discussed in Japanese Laid-Open Patent Application H10-39388 is a silver halide camera that makes use of silver halide film, and is equipped with a lens unit and a camera body. This camera body includes a film cartridge chamber, a spool chamber, a focal plane shutter, and a charge capacitor used for a flash. The cartridge chamber and the spool chamber are disposed on the left and right sides with the focal plane shutter in between. The spool chamber is equipped with a spool, and the flash charge capacitor is disposed in the spool.

With the camera discussed in Japanese Laid-Open Patent Application 2001-75158, a charge capacitor with a flat shape is disposed at the bottom of the camera.

SUMMARY

Since a capacitor takes up a relatively large space, the disposition of a capacitor can hinder efforts to make digital cameras smaller. Therefore, when reducing the size of the camera body is taken into account, efficiently disposing the capacitor becomes of major importance.

Meanwhile, with conventional digital cameras with an interchangeable lens design, reducing the size of the camera body is difficult because a mirror box is provided. In view of this, the inventors have developed a new interchangeable lens type of digital camera that has no mirror box. Because it has no mirror box, this digital camera does not need a reticle, a pentaprism, or other such optical viewfinder function, as is the case with a conventional interchangeable lens type of digital camera. In other words, with this digital camera, the optical viewfinder unit can be omitted.

However, depending on the layout of the body mount and the imaging element, there may be dead space that was not encountered in the past, which hinders efforts to reduce the size of the camera body.

A camera body according to the first aspect allows the mounting of a lens unit configured to form an optical image of a subject, and comprises a body mount, an imaging element, a capacitor, and a housing member. The body mount allows a lens unit to be mounted. The imaging element includes a light receiving face arranged to receive light passing through the lens unit, and converts an optical image of the subject into an electrical signal. The capacitor is disposed above the imaging element and more to the imaging element side than the body mount in a landscape orientation, and stores electrical charges. The housing member accommodates the imaging element and the capacitor.

With this camera body, since the capacitor is disposed above the imaging element and more to the imaging element side than the body mount, the dead space produced by the layout of the body mount and the imaging element can be effectively utilized, which allows the size to be reduced.

The landscape orientation referred to here is the orientation of the camera body in which the vertical direction in the acquired image is substantially parallel to the short sides of the image. More precisely, it refers to the orientation of the camera body when, of the outer faces of the housing member, the face on which the shutter button or hot shoe is provided is located above the imaging element in the vertical direction. Also, the phrase "above the imaging element" means vertically above the imaging element in a state of landscape orientation.

An imaging device according to the second aspect is an imaging device for acquiring an image of a subject, comprising a lens unit configured to form an optical image of a subject, and the camera body according to the first aspect, to which a lens unit can be mounted.

In this case, since the imaging device is equipped with the camera body according to the first aspect, the imaging device can be made more compact.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

The digital camera according to this embodiment (an example of an imaging device) includes the camera body 1 and a lens unit.

1: Lens Unit

The lens unit (not shown) includes an optical system (not shown) that forms an optical image of a subject, a lens mount (not shown) having an electrical contact (not shown), and a lens controller (not shown). The lens mount is mounted to a body mount 150 (discussed below) of the camera body 1. The line AX in FIG. 3 indicates the optical axis center line of the optical system. The lens controller holds lens data related to the use of the lens unit and so forth, and lens data can be transferred through the electrical contact to a camera controller (not shown) mounted to a main circuit board 140 (discussed below) of the camera body 1. Focus lens drive control, aperture drive control, blur correction control, and so forth are performed by the lens controller and the camera controller.

2: Camera Body

2-1: Overview of Camera Body

Figure 1:
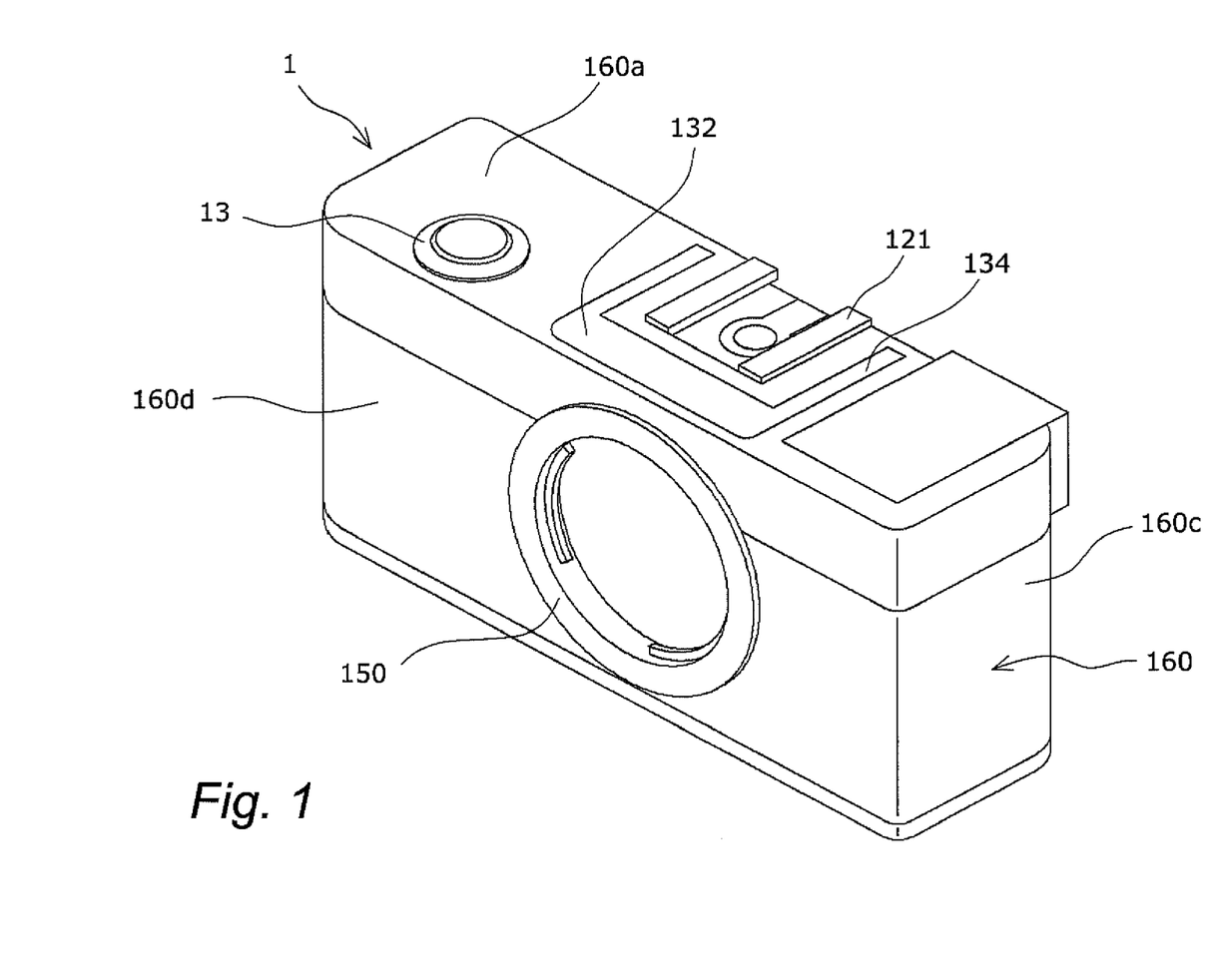
FIG. 1 is an oblique view of a camera body 1 (an example of a camera body)
Figure 2:
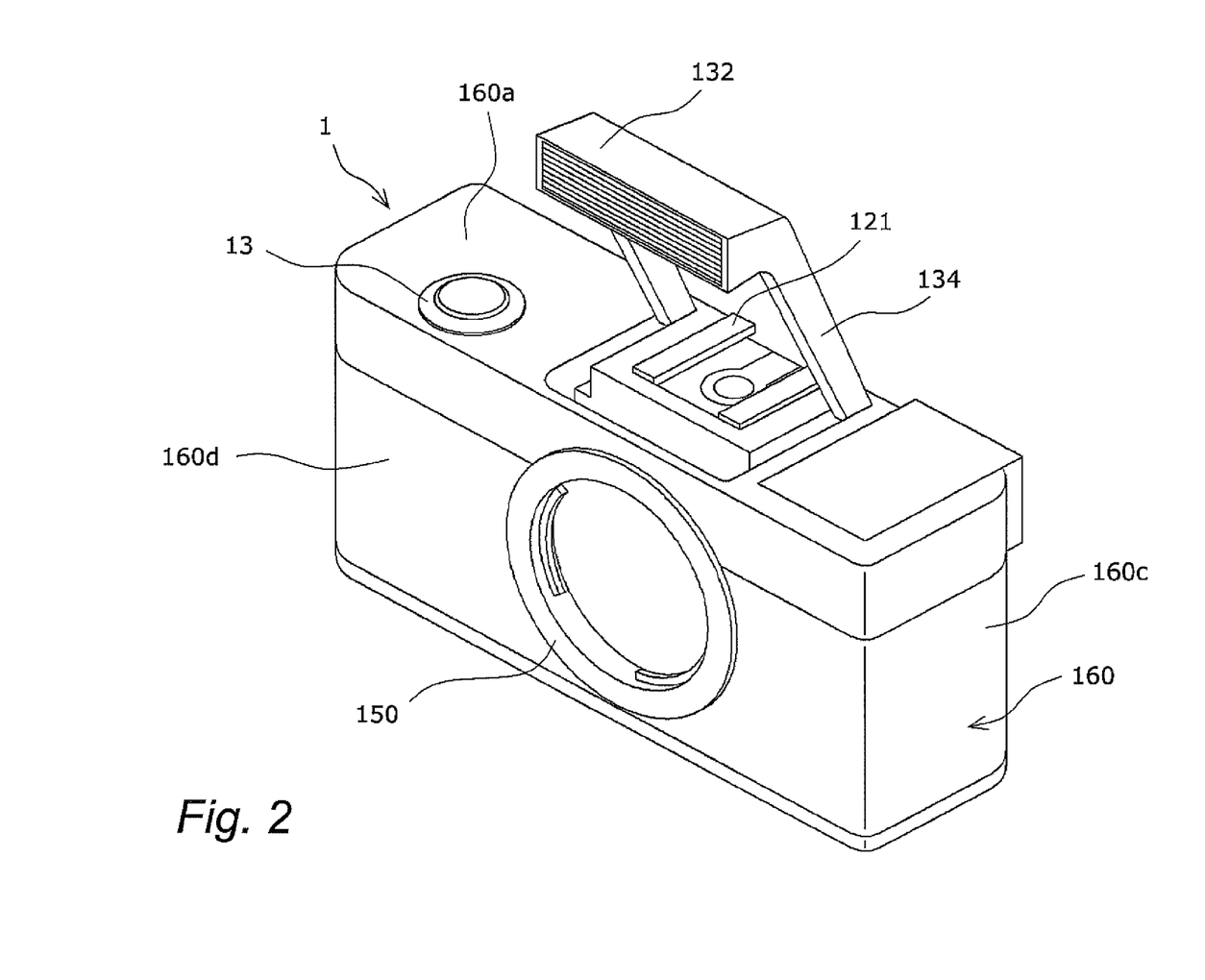
FIG. 2 is an oblique view of the camera body 1 when the flash has popped up.
Figure 3:
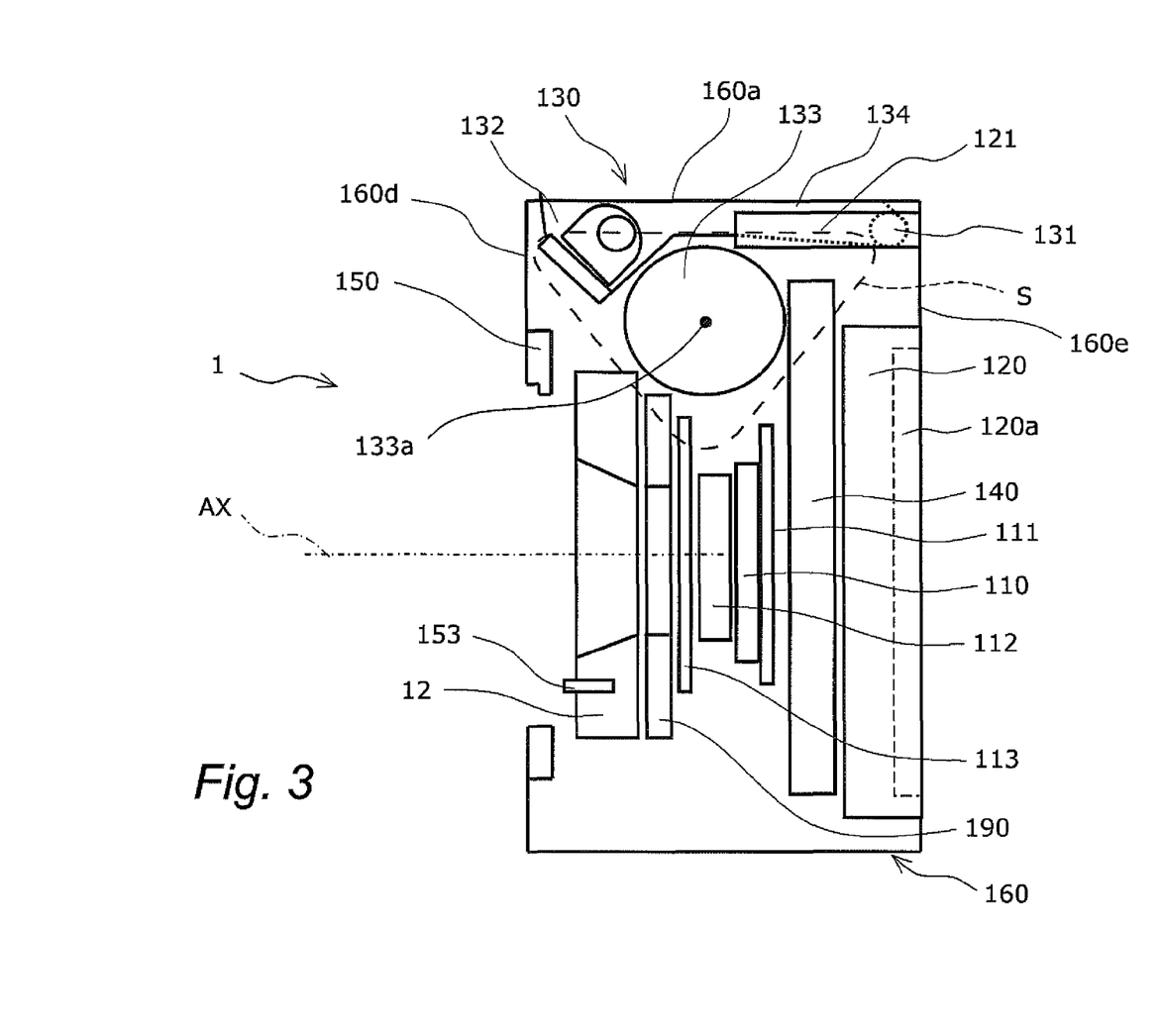
FIG. 3 is a middle, vertical cross section of the camera body 1.
Figure 4:
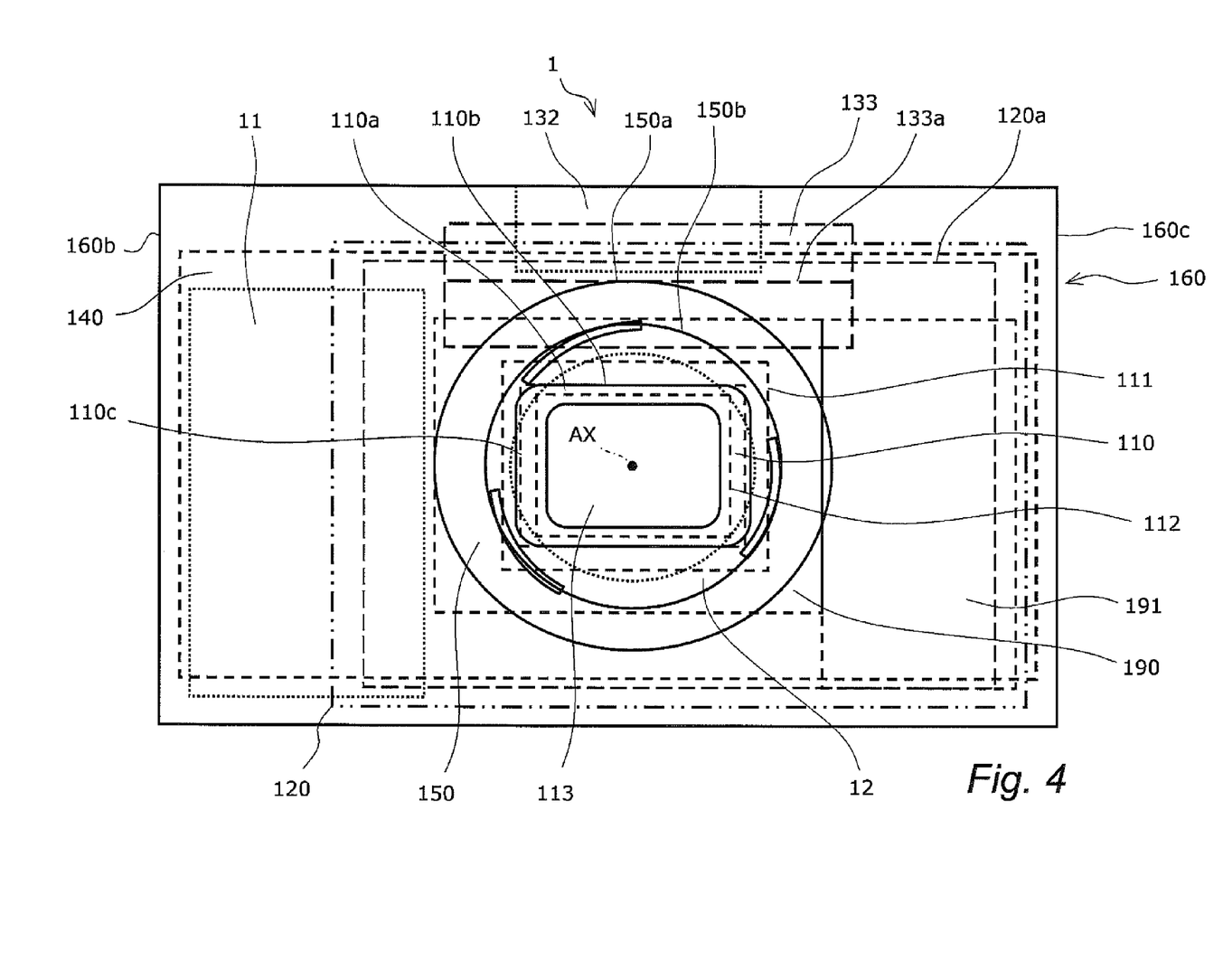
FIG. 4 is a front see-through view of the camera body 1.
Figure 5:
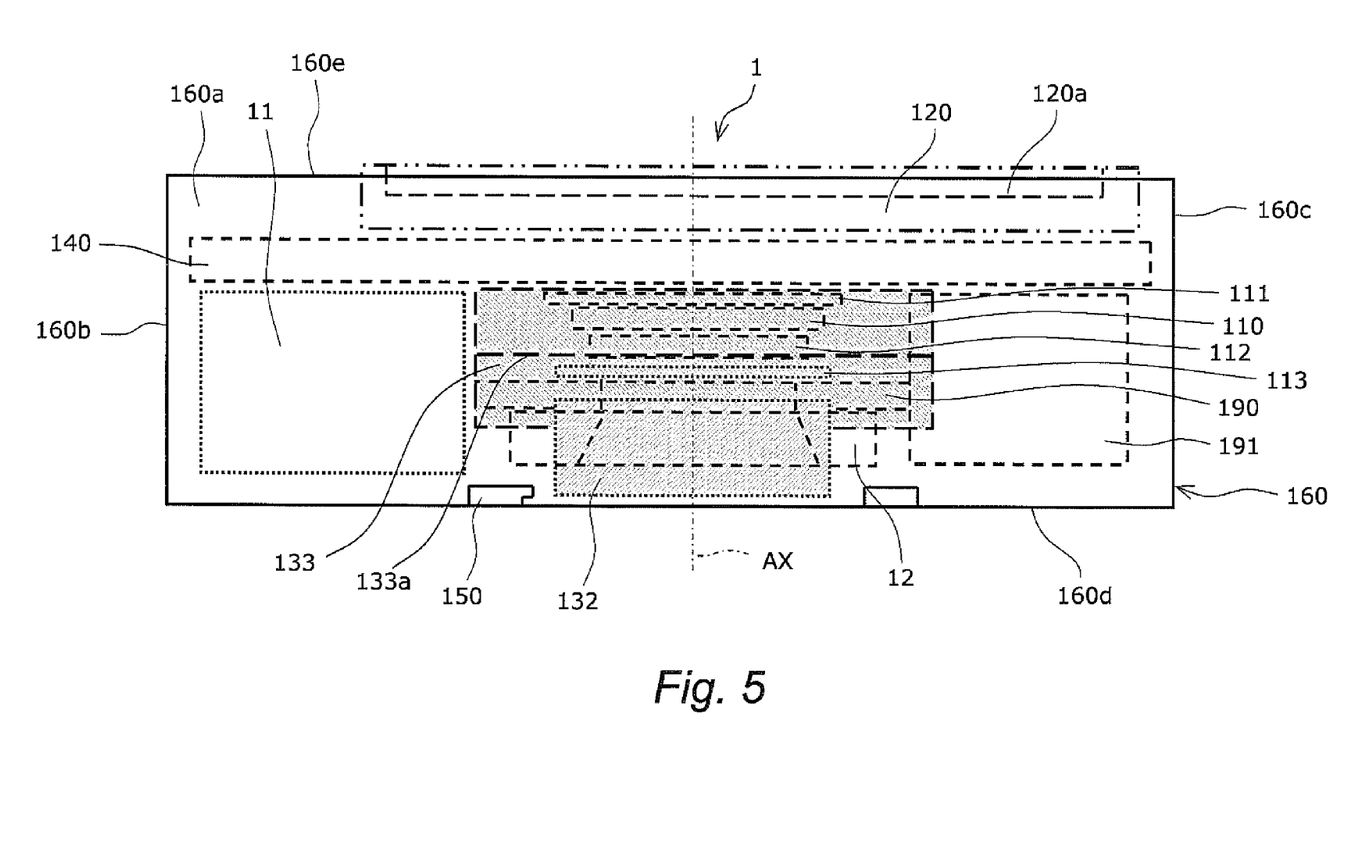
FIG. 5 is a top see-through view of the camera body 1.

FIG. 1 is an oblique view of the camera body 1 according to this embodiment. A lens unit (not shown) can be mounted to the body mount 150 of the camera body 1. FIG. 2 is an oblique view of the camera body 1, and shows a flash light emitter 132 in its popped up state. FIG. 3 is a middle, vertical cross section of the camera body 1. FIG. 4 is a front see-through view of the camera body 1. FIG. 5 is a top see-through view of the camera body 1.

As shown in FIG. 3, the camera body 1 has no mirror box. Accordingly, its flange back is smaller than that of a conventional single lens reflex camera. Making the flange back smaller also reduces the size of the camera body. Furthermore, making the flange back smaller reduces the size of the lens unit.

The various components will now be described in detail. To facilitate the description, the subject side of the camera body 1 will be referred to as the front, the image plane side as the rear or back, the vertical upper side in the normal orientation of the camera body 1 (also called landscape orientation) as the top or above, the vertical lower side as the bottom or below, and the left or right side as the side.

Here, landscape orientation refers to the orientation of the camera body 1 in which the vertical direction in the acquired image is substantially parallel to the short sides of the image, and more precisely, refers to the orientation of the camera body 1 in which the face on which the shutter button 13 (discussed below) or hot shoe 121 (discussed below) is provided is located on the vertical upper side with respect to a CMOS image sensor 110 (discussed below).

2-2: Configuration of Camera Body

The configuration of the camera body 1 according to this embodiment will be described through reference to FIGS. 1 to 5.

The camera body 1 mainly includes a CMOS (complementary metal oxide semiconductor) image sensor 110, a CMOS circuit board 111, a display device 120, the main circuit board 140, the body mount 150, a shutter unit 190, an optical low-pass filter 112, a diaphragm 113, a battery 11, a flash device 130, the hot shoe 121, and a housing member 160. The camera body 1 does not have a mirror box. The body mount 150, the shutter unit 190, the diaphragm 113, the optical low-pass filter 112, the CMOS image sensor 110, the CMOS circuit board 111, the main circuit board 140, and the display device 120 are disposed in that order, starting from the front, in the camera body 1.

The housing member 160 has a body 12, an upper face 160a, a side face 160b, a side face 160c, a front face 160d, and a rear face 160e, and is a member that accommodates in its interior the CMOS image sensor 110, a capacitor 133, and other such parts. As shown in FIG. 3, the body 12 is a member that supports the body mount 150, and an electrical contact 153 is provided that can be connected with the electrical contact of the lens mount.

As shown in FIGS. 1, 3, and 4, the upper face 160a of the housing member 160 (that is, the camera body 1) is the outer face of the housing member 160, and is the outer face that is disposed above the CMOS image sensor 110 (discussed below) when viewed in a first direction (discussed below) when the camera body 1 is in its landscape orientation (see FIG. 1). The side face 160b is the outer face on the left side (see FIG. 4), and the side face 160c is the outer face on the right side (see FIG. 4). The front face 160d is the outer face on the side where the body mount 150 (discussed below) is provided (see FIG. 3), and the rear face 160e is the outer face on the opposite side from the body mount 150 with respect to the CMOS image sensor 110 (see FIG. 3).

The CMOS image sensor 110 (an example of an imaging element) converts an optical image of a subject into an electrical image signal. The CMOS image sensor 110 has a light receiving face 110a that receives light passing through the lens unit. In this embodiment, the light receiving face 110a is rectangular, and has long sides 110b and short sides 110c. The light that passes through the lens unit forms an optical image of a subject on the light receiving face 110a, and the CMOS image sensor 110 produces an image signal of the subject by opto-electric conversion from the optical image thus formed. The CMOS image sensor 110 is controlled by the CMOS circuit board 111 (discussed below), and acquires still picture signals and moving picture signals. These still picture signals and moving picture signals are examples of image signals.

Since the light receiving face 110a here is rectangular, the images acquired by the CMOS image sensor 110 are also rectangular, and have long and short sides. When the camera body 1 is in its landscape orientation, the vertical direction in the acquired image is substantially parallel to the short sides of the image.

Here, the direction perpendicular to the light receiving face 110a is termed the first direction (also called the longitudinal direction). The vertical direction in landscape orientation is termed the second direction (also called the up and down direction). The left and right direction in landscape orientation is termed the third direction. The first direction is parallel to the optical axis AX of the lens unit in a state in which the lens unit is mounted to the camera body 1.

The CMOS image sensor 110 is an example of an imaging element, and this imaging element is a concept that encompasses a CCD (charge coupled device) image sensor and the like.

The CMOS circuit board 111 (an example of an imaging element circuit board) is a circuit board that is disposed behind the CMOS image sensor 110 and controls the drive of the CMOS image sensor 110. More specifically, the CMOS circuit board 111 has a timing generator and controls the operation of the CMOS image sensor 110. The CMOS circuit board 111 is also a circuit board that subjects image signals from the CMOS image sensor 110 to specific processing. More specifically, the CMOS circuit board 111 has an A/D converter that converts the analog image signals produced by the CMOS image sensor 110 into digital image signals. The CMOS circuit board 111 is an example of an imaging element circuit board that controls the drive of the imaging element and subjects image signals from the imaging element to A/D conversion or other specific processing.

The main circuit board 140 is a board on which the various electronic parts that control the various components of the digital camera are mounted. More specifically, a camera controller that controls the various components of the camera body 1 and the lens unit is mounted on the main circuit board 140.

The camera controller adjusts the exposure time of the imaging element by controlling a shutter drive device 191 (discussed below) and actuating the shutter unit 190.

The camera controller also controls the CMOS circuit board 111. The CMOS circuit board 111 controls the imaging element and performs image signal processing and so forth on the basis of control signals produced by the camera controller.

The camera controller further processes the image signals that have undergone A/D conversion or other processing by the CMOS circuit board 111, to produce image data (or video data). More specifically, the camera controller produces display-use image data (or display-use video data) and recording-use image data (or recording-use video data). More precisely, the camera controller subjects the image signals outputted from the CMOS circuit board 111 to gamma correction processing, white balance correction processing, scratch correction processing, YC conversion processing, electronic zoom processing, JPEG (Joint Photographic Experts Group) compression processing, or other such processing. The display-use image data (or display-use video data) thus produced is displayed on the display device 120. Also, the recording-use image data (or recording-use video data) thus produced is recorded to a recording medium (not shown).

Also, as discussed above, the camera controller controls the lens unit through the lens controller.

The camera controller is electrically connected to the shutter button 13 and other such controls, and receives signals inputted from the controls. Information obtained from signals inputted from the controls is used in controlling the various components of the digital camera.

The display device 120 (an example of a display unit) is a liquid crystal display, for example, and includes a display screen 120a that displays an image indicating the display-use image data, etc. The display-use image data is image signals that have undergone image processing, the photography conditions of the camera body 1, data for displaying control menus and so forth as images, and the like. The display device 120 is able to selectively display both moving pictures and still pictures.

The display device 120 is provided to the camera body 1. As shown in FIGS. 3 and 5, with this embodiment, the display device 120 is disposed so as to be embedded in the rear face 160e of the housing member 160, and is disposed so that the display screen 120a can be seen from the rear of the camera body 1. Disposing the display device 120 in this way allows the user to hold the camera body 1 in an orientation in which the lens unit faces the subject, while checking the image of the subject displayed on the display screen 120a.

The display device 120 is an example of a display unit provided to the camera body 1. The display unit can instead be an organic electroluminescence device, an inorganic electroluminescence device, a plasma display panel, or something else capable of displaying images.

The body mount 150 allows the mounting of the lens unit. The lens unit is mounted to the body mount 150 by what is known as bayonet coupling.

Since the electrical contact 153 is connected to the electrical contact of the lens mount when the lens unit has been mounted, the lens unit is electrically connected to the camera body 1. In other words, data and control signals can be sent back and forth between the camera body 1 and the lens unit via the electrical contact 153 and the electrical contact of the lens mount. More specifically, data issued by the lens controller inside the lens unit goes through the electrical contact 153 and the electrical contact of the lens mount and is transmitted to the camera controller inside the camera body 1. The camera controller produces a control signal on the basis of the inputted data, and transmits it to the lens controller. The lens controller controls the various components of the lens unit on the basis of control signals inputted from the camera controller via the electrical contact 153 and the electrical contact of the lens mount.

As shown in FIG. 4, the body mount 150 is a circular ring-shaped member, and has an outer edge 150a and an inner edge 150b. Here, when viewed in the first direction (a direction perpendicular to the light receiving face 110a), the inner side of the inner edge 150b is the opening of the body mount, and this opening is made larger than the imaging element so as not to impede the light that is guided through the lens unit to the CMOS image sensor 110. That is, when viewed in a direction perpendicular to the light receiving face 110a, the body mount 150 is disposed so as to surround the CMOS image sensor 110. Thus, the body mount 150 is larger than the CMOS image sensor 110, so there tends to be dead space at a place that is above the CMOS image sensor 110 and is behind the body mount 150.

The shutter unit 190 is what is known as a focal plane shutter, and has a front curtain (not shown) and a rear curtain (not shown). The exposure time of the CMOS image sensor 110 is adjusted by a slit formed between the front and rear curtains. As shown in FIG. 3, the shutter unit 190 is disposed between the body mount 150 and the CMOS image sensor 110. The shutter unit 190 is driven by the shutter drive device 191, and performs shutter operation necessary for exposure. The timing of shutter drive is controlled by the camera controller. More specifically, when the shutter button 13 is pressed, a signal is sent from the shutter button 13 to the camera controller, and a control signal is sent from the camera controller to the shutter drive device 191. When the control signal is inputted, the shutter drive device drives the shutter unit 190, and exposure of the CMOS image sensor 110 is performed.

The optical low-pass filter 112 is disposed between the CMOS image sensor 110 and the shutter unit 190, and removes the high-frequency component of the subject light. More specifically, the optical low-pass filter 112 separates the optical image of the subject produced by the lens unit so that the resolution is lower than the pixel pitch of the CMOS image sensor 110. In general, a YCM complementary color filter or RGB color filter called a Bayer array is provided for each pixel of a CMOS image sensor or other such imaging element. Therefore, if an image of a subject is resolved down to one pixel, not only is a false color generated, but if the subject has a repeating pattern, an unattractive moire will result. Furthermore, the optical low-pass filter 112 has an Ir cut filter function for cutting out infrared light.

The diaphragm 113 is disposed in front of the CMOS image sensor 110, and prevents dust from clinging to the CMOS image sensor 110. Also, any dust clinging to the diaphragm 113 itself is knocked off by the vibration of the diaphragm 113. More specifically, the diaphragm 113 is configured such that a thin, transparent sheet-like member is fixed to another member via a piezoelectric element. AC voltage is applied to the piezoelectric element, which causes it to vibrate, and this vibrates the sheet-like member.

An antifogging layer is formed on the front face of the diaphragm 113. More specifically, a transparent coating of a photocatalyst such as titanium oxide is applied. The antifogging layer may also be formed on the front face of the optical low-pass filter 112, or on the front face of the CMOS image sensor 110. Preferably, an antifogging layer is formed on at least the front face of the member disposed farthest forward out of the members that transmit light from the lens unit and disposed along the optical path from the lens unit to the CMOS image sensor 110. In this embodiment, the diaphragm 113 is disposed the farthest forward out of the members that transmit light from the lens unit and disposed along the optical path from the lens unit to the CMOS image sensor 110. Consequently, even if the shutter unit 190 is in its open state, water (such as saliva), oil, or the like that has come in from the body mount 150 is easily removed from the surface of the diaphragm 113 by the titanium oxide, which is a photocatalyst. More specifically, when light hits the titanium oxide, electrons are scattered, so the surface of the diaphragm 113 has a powerful oxidizing force. The surface of the diaphragm 113 having this powerful oxidizing force robs electrons from hydroxide ions in the air, and the hydroxide ions become extremely unstable hydroxy radicals. Since hydroxy radicals also have a powerful oxidizing force, they rob electrons from nearby organic substances, and organic substances that are the cause of fogging decompose into water and carbon dioxide and are released in to the air.

When the diaphragm 113 is vibrated, its effect is even more pronounced. Furthermore, the photocatalyst is preferably one that absorbs UV rays, such as titanium oxide, or one that absorbs infrared rays. This is because these substances transmit visible light, so there will be less of a reduction in the visible light that reaches the CMOS image sensor 110.

The antifogging layer may also be given a multilayer AR (antireflection) coating or the like that is resistant to fingerprints.

The capacitor 133 stores electrical charges, and supplies power by releasing the stored charge. In this embodiment, the power stored in the capacitor 133 is primarily supplied to the flash device 130 (discussed below). More specifically, a charge that has been supplied by the battery 11 and boosted in voltage by a booster circuit is stored, and the capacitor 133 releases the charge in conjunction with the operation of the shutter unit 190 to supply power to the flash device 130. The power supplied from the capacitor 133 causes the flash light emitter 132 to emit light.

The battery 11 (an example of a power supply unit) supplies the various components with power for use by the camera body 1. The battery 11 may be a dry cell or a rechargeable cell.

The flash device 130 has the flash light emitter 132, a support member 134, and a pop-up hinge 131 (an example of a rotary hinge).

The flash light emitter 132 emits flash light. More specifically, the flash light emitter 132 receives the supply of power from the capacitor 133, and emits light in conjunction with the operation of the shutter unit 190.

The support member 134 supports the flash light emitter 132 with respect to the housing member 160. As shown in FIG. 2, the flash device 130 is able to pop up above the body mount 150. In its popped up state, the flash light emitter 132 is supported above the body mount 150 by the support member 134. The emission of flash light is carried out in this popped up state.

The pop-up hinge 131 rotatably connects the support member 134 and the housing member 160.

The hot shoe 121 is disposed on the upper face 160a of the housing member 160, and allows universal external parts to be mounted. An example of such a universal external part is an attachable flash light emitting device.

3: Single Lens Reflex Camera of Comparative Example

Figure 6:
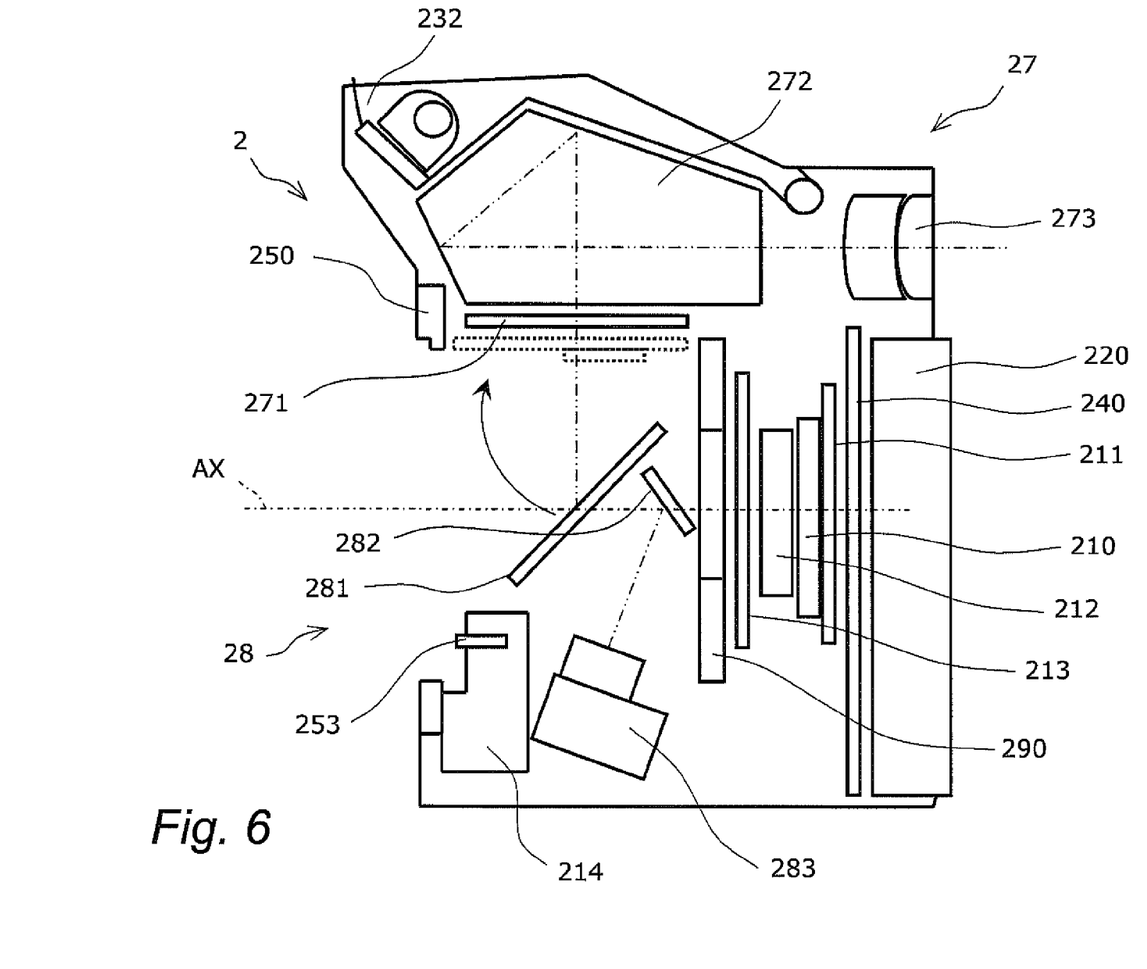
FIG. 6 is a middle, vertical cross section of a camera body 2 (the camera body of the interchangeable lens type of single lens reflex camera in a comparative example).

A camera body 2 of a conventional interchangeable lens type of digital single lens reflex camera will now be described. FIG. 6 is a middle, vertical cross section of the camera body 2.

As shown in FIG. 6, the camera body 2 mainly includes a body 214, a CMOS image sensor 210, a CMOS circuit board 211, a display device 220, a main circuit board 240, a body mount 250, a mirror box 28, an optical viewfinder 27, a shutter unit 290, an optical low-pass filter 212, a diaphragm 213, a battery 21, and a flash device 230. Other than the mirror box 28, these have substantially the same function as the corresponding structures of the camera body 1, and will not be described again in detail.

With the mirror box 28, a semitransparent main mirror 281 is disposed in a state of being tilted upward by about 45 degrees, and the optical image of the subject produced by the lens unit and reflected by the main mirror 281 is guided to the optical viewfinder 27. At the main mirror 281, a total-reflection sub-mirror 282 is disposed facing downward, and the optical image of the subject reflected by the sub-mirror 282 is guided to an AF sensor 283. When a release subject is inputted, the main mirror 281 and the sub-mirror 282 are flipped up before the shutter unit 290 starts its exposure, and an optical path to the CMOS image sensor 210 is ensured. Here, for example, the release signal is inputted to the camera body 2 when a shutter button (not shown) is pressed.

The AF sensor 283 is a phase difference detection module, for example, and detects the focal position. Information about the focal position acquired by the AF sensor 283 is sent to the lens unit, and drive of the focus lens of the lens unit is controlled on the basis of the focal position information thus sent.

The optical viewfinder 27 is a viewfinder that the user uses to check the optical image of the subject, and has a reticle 271, a pentaprism 272 having an image inversion function, and an eyepiece lens 273 that magnifies the optical image of the subject. The reticle 271 is disposed at a position where the optical distance from the main mirror 281 is equal to the optical distance between the CMOS image sensor 210 and the main mirror 281. Accordingly, an optical image of the subject is formed at the reticle 271 in the same focal state as that of the optical image of the subject formed at the CMOS image sensor 210. The optical image of the subject formed at the reticle 271 is inverted to an erect image by the pentaprism 272 and magnified by the eyepiece lens 273. Consequently, the user can check the optical image of the subject by looking through the eyepiece lens 273.

Since a flash light emitter 232 is usually disposed further above the pentaprism 272, with the camera body 2 in this comparative example, the size in the up and down direction tends to be larger, making a reduction in size more difficult.

The lens unit, just as with the camera body 1, can be attached by bayonet coupling to the body mount 250. After coupling, the camera body 2 is electrically connected with the lens unit by an electrical contact 253.

4: Layout of Parts

With the camera body 1 discussed above, unlike with the camera body 2, no mirror box is installed, so the optical viewfinder 27 can also be eliminated.

However, depending on the layout of the parts, there is dead space not present with the camera body 2, and the size cannot be efficiently reduced.

In view of this, with the camera body 1, a reduction is size is achieved mainly by manipulating the layout of the capacitor 133.

More specifically, as shown in FIG. 3, the capacitor 133 is disposed more to the CMOS image sensor 110 side than the body mount 150 and above the CMOS image sensor 110. In other words, the capacitor 133 is disposed in a space S bounded by the CMOS image sensor 110, the body mount 150, and the upper face 160a of the housing member 160. As shown in FIG. 4, the capacitor 133 here is disposed so as to overlap the outer edge 150a and inner edge 150b of the body mount 150 when the camera body 1 is viewed in the first direction (perpendicular to the light receiving face 110a). That is, the capacitor 133 is disposed so as to enter the space above the CMOS image sensor 110 and get close to the CMOS image sensor 110.

The capacitor 133 also overlaps the display device 120 when viewed in the first direction. Therefore, as shown in FIG. 3, the space S in which the capacitor 133 is housed can be considered to be a space bounded by the CMOS image sensor 110, the upper face 160a of the housing member 160, and the display device 120.

Also, as shown in FIGS. 3 and 4, the capacitor 133 in this embodiment is cylindrical in shape and has a center axis 133a. The capacitor 133 is disposed so that the direction of the center axis 133a is substantially parallel to the long sides 110b of the CMOS image sensor 110. FIG. 3 is a view in the third direction (the left and right direction in landscape orientation), and the capacitor 133 is drawn as a circle. FIG. 4 is a view in the first direction (perpendicular to the light receiving face 110a), and the capacitor 133 is drawn as a rectangle.

As shown in FIG. 5, when viewed from above the camera body 1 (when viewed in the second direction), the capacitor 133 is disposed so as to be superposed with the CMOS image sensor 110.

The capacitor 133 in this embodiment is disposed in the space (see FIG. 6) in which the optical viewfinder 27 (discussed below) is disposed in the single lens reflex camera of the comparative example. What makes this disposition possible is that the mirror box is eliminated, so the optical viewfinder unit can also be eliminated.

With the camera body 1 here, the optical low-pass filter 112, the diaphragm 113, the shutter unit 190, the body 12, and the body mount 150 are disposed in that order from ahead of the CMOS image sensor 110, and the size of the parts in the up and down direction roughly increases in this order. Also, the CMOS circuit board 111, the main circuit board 140, and the display device 120 are disposed in that order toward the rear from the CMOS image sensor 110, and the size of the parts in the up and down direction roughly increases in this order. Therefore, as shown in FIG. 3, these members have an overall middle, vertical cross sectional shape that is called a drum shape, and the space S formed above these members has a recessed shape.

Meanwhile, the capacitor 133 that supplies power to the flash device 130 has a cylindrical shape, and the housing member 160 of the camera body 1 is made up of substantially flat faces, so when the cylindrical capacitor 133 is disposed, dead space tends to be produced in the interior of the camera body 1.

In view of this, with this embodiment, the capacitor 133 is disposed in the space S so that the center axis 133a of the capacitor 133 is substantially parallel to the long sides 110b of the CMOS image sensor 110. This allows the dead space to be effectively utilized, and affords a more efficient layout.

Also, as shown in FIGS. 4 and 5, the battery 11 is disposed between the capacitor 133 and the side face 160b of the housing member 160. The battery 11 and the capacitor 133 are also disposed so that the position of the upper face of the battery 11 is above the position of the lower face of the capacitor 133. That is, when viewed in the third direction, the battery 11 is superposed with the capacitor 133.

The flash device 130 can be stowed in the camera body. FIGS. 1 and 3 show the state in which the flash device 130 has been stowed in the camera body 1. Since the support member 134 is rotatably connected to the upper face 160a of the housing member 160 via the pop-up hinge 131, the popped up state or the stowed state is selected by turning the support member 134 around the pop-up hinge 131.

As shown in FIG. 3, in the stowed state the flash light emitter 132 is stowed between the capacitor 133 and the front face 160d of the housing member 160. Also, the pop-up hinge 131 is disposed between the capacitor 133 and the rear face 160e of the housing member 160.

Thus disposing the flash light emitter 132 and the pop-up hinge 131 in the gaps between the capacitor 133 and the housing member 160 allows dead space to be utilized even more effectively.

5: Features of Camera Body

The features of the camera body 1 described above are compiled below.

(1) With this camera body 1, since the capacitor 133 is disposed more to the CMOS image sensor 110 side than the body mount 150 and above the CMOS image sensor 110, dead space produced by the layout of the body mount 150 and the CMOS image sensor 110 can be effectively utilized.

Also, when viewed in the first direction (perpendicular to the light receiving face 110a), part of the capacitor 133 is disposed in a first region bounded by the outline of the body mount 150 (the outer edge 150a). Furthermore, when viewed in the first direction, part of the capacitor 133 is disposed in a second region bounded by the inner edge 150b of the body mount. This configuration allows the capacitor 133 to be disposed relatively close to the CMOS image sensor 110, and allows dead space formed above the CMOS image sensor 110 to be utilized more effectively.

As discussed above, with this camera body 1, a reduction in size is possible through effective utilization of dead space.

Furthermore, disposing the capacitor 133 relatively close to the CMOS image sensor 110 makes it easier for the capacitor 133 to absorb heat generated by the CMOS image sensor 110, so heat damage to the CMOS image sensor 110 and its surrounding electronic components can be reduced. In addition, since the temperature of the capacitor 133 is raised by the heat it absorbs from the CMOS image sensor 110, the impedance characteristics of the capacitor 133 can be improved. That is, disposing the capacitor 133 as above allows the heat generated by the CMOS image sensor 110 to be effectively utilized.

(2) Since the photographic positioning of the subject can be checked visually by using the display device 120, even if the camera body 1 is made more compact, it is preferable for the display device 120 to be as large as possible.

However, if the display device 120 is made larger, the gap between the upper end of the CMOS image sensor 110 and the upper end of the display device 120 ends up being wider, and there is more dead space bounded by the upper face of the CMOS image sensor 110, the body mount 150, and the display device 120.

In view of this, with the camera body 1, as shown in FIG. 3, the capacitor 133 is disposed so that part of the capacitor 133 when viewed in the first direction is superposed with the display device 120. That is, the capacitor 133 is disposed in the dead space produced between the upper end of the CMOS image sensor 110 and the upper end of the display device 120, so the parts can be disposed more efficiently.

(3) With this camera body 1, the capacitor 133 is disposed in the space S bounded by the body mount 150, the CMOS image sensor 110 (which is smaller in the up and down direction than the body mount 150), and the upper face 160a of the housing member 160, and the parts are disposed efficiently, so the camera body 1 can be more compact.

The space S could also be considered to be a space bounded by the CMOS image sensor 110, the upper face 160a of the housing member 160, and the display device 120. Furthermore, the space S could be considered to be a space bounded by the body mount 150, the CMOS image sensor 110, the upper face 160a of the housing member 160, the display device 120, and the CMOS circuit board 111.

(4) With this camera body 1, the capacitor 133 is disposed above the CMOS image sensor 110, and the battery 11 is disposed between the capacitor 133 and the side face 160b of the housing member 160, so a comparatively large space can be ensured in the up and down direction for the installation of the battery 11.

Also, a battery generally exhibits better characteristics at temperatures that are higher than room temperature. For example, the discharge characteristics of a battery (related to the discharge time and voltage) are better at temperatures that are higher than room temperature.

With this camera body 1, when the capacitor 133 absorbs heat generated by the CMOS image sensor 110, the heat of the capacitor 133 is readily transferred to the battery 11 disposed between the capacitor 133 and the side face 160b. This tends to keep the temperature of the battery 11 high, so better characteristics of the battery 11 can be anticipated.

(5) Since the light receiving face 110a of the CMOS image sensor 110 is rectangular in shape, the space S formed above the CMOS image sensor 110 is slender in the direction of the long sides 110b of the light receiving face 110a of the CMOS image sensor 110. Accordingly, the space S is suited to disposing parts that extend a certain direction, such as a cylinder.

With this camera body 1, the capacitor 133 is disposed so that the direction of the center axis 133a of the cylindrical capacitor 133 is substantially parallel to the direction of the long sides 110b of the light receiving face 110a. Consequently, the slender capacitor 133 that extends in a certain direction can be efficiently disposed inside the camera body 1, and this makes it possible for the camera body 1 to be more compact.

Also, as shown in FIG. 3, starting form the CMOS image sensor 110, the farther forward that the parts are disposed ahead of the CMOS image sensor 110, the larger they are in the up and down direction, and similarly, the farther rearward that the parts are disposed behind the CMOS image sensor 110, the larger they are in the up and down direction. Accordingly, when the camera body 1 is viewed in the third direction (the left and right direction in landscape orientation), the more likely it is that a depression suited to disposing cylindrical parts will be formed above the CMOS image sensor 110.

With this camera body 1, as shown in FIG. 3, the cylindrical capacitor 133 is disposed in this depression, so dead space can be utilized more effectively.

(6) With this camera body 1, the flash device 130 can be installed in the housing member 160, and the flash light emitter 132 is installed between the capacitor 133 and the front face 160d of the housing member 160 (that is, the face of the housing member that supports the body mount 150). Thus disposing the capacitor 133 produces the gap with the housing member 160 and the flash light emitter 132 is efficiently disposed in the gap, so the camera body 1 can be even more compact when the flash device 130 is installed.

In particular, a gap tends to be produced between the corner formed by the upper face 160a and the front face 160d of the housing member 160 and the cylindrical capacitor 133. Efficiently installing the flash light emitter 132 in this gap allows dead space to be utilized more effectively.

(7) With this camera body 1, the pop-up hinge 131 is provided between the capacitor 133 and the rear face 160e of the housing member 160 (that is, the housing face of the housing member 160 that is on the opposite side from the body mount 150 with respect to the CMOS image sensor 110), which allows the flash device 130 to be efficiently disposed in the dead space produced by disposing the capacitor 133, and this affords a camera body 1 that is even more compact.

6: Other Embodiments

The specific constitution of the present invention is not limited to the above embodiment, and various modifications and alterations are possible without departing from the gist of the present invention.

(A) In the above embodiment, the digital camera was capable of capturing both still and moving pictures, but may instead be capable of capturing only still pictures, or only moving pictures. Also, the digital camera is not limited to an interchangeable lens type of digital camera, and may instead be a digital still camera or a digital video camera, for example.

(B) In the above embodiment, when the capacitor 133 is viewed in the first direction (perpendicular to the light receiving face 110a), part of the capacitor 133 is disposed in a first region bounded by the outer edge 150a of the body mount 150, but the entire capacitor 133 may instead be disposed in the first region.

Also, when the capacitor 133 is viewed in the first direction, part of the capacitor 133 is disposed in a second region bounded by the inner edge 150b of the body mount 150, but the entire capacitor 133 may instead be disposed in the second region.

Furthermore, in the above embodiment, when the capacitor 133 is viewed in the first direction, part of the capacitor 133 overlaps the display device 120, but the entire capacitor 133 may instead overlap the display device 120.

As long as the capacitor 133 is disposed more to the CMOS image sensor 110 side than the body mount 150 and above the CMOS image sensor 110, the camera body 1 can be made more compact even though the capacitor 133 is not disposed in the first region. Also, as long as the capacitor 133 is disposed more to the CMOS image sensor 110 side than the body mount 150 and above the CMOS image sensor 110, the camera body 1 can be made more compact even though the capacitor 133 is not disposed in the second region. As long as the capacitor 133 is disposed more to the CMOS image sensor 110 side than the body mount 150 and above the CMOS image sensor 110, the camera body 1 can be made more compact even though the capacitor 133 does not overlap the display device 120.

(C) The display device 120 need not be produced on the rear face 160e of the housing member 160, and may be provided somewhere else instead, such as the upper face 160a, the side face 160b, or the side face 160c.

Also, in the above embodiment, the display device 120 is fixed to the rear face 160e of the housing member 160, but the display device 120 may be connected so that its orientation with respect to the camera body 1 can be changed. For instance, the display device 120 may be connected to the camera body 1 via a hinge, so that the display device 120 can be rotated up and down or to the left or right with respect to the housing member 160. In this case, a holder may be provided to the rear face 160e, and the display device 120 installed in this holder.

Furthermore, an electronic viewfinder may be provided as a display unit, or both the display device 120 and an electronic viewfinder may be provided.

(D) When viewed in the first direction (perpendicular to the light receiving face 110a), the capacitor 133 and the CMOS circuit board 111 may be superposed. The CMOS circuit board 111 is generally about the same size as the CMOS image sensor 110, so when the capacitor 133 and the CMOS circuit board 111 are disposed so as to be superposed when viewed in the first direction, the capacitor 133 is closer to the CMOS image sensor 110. Disposing the capacitor 133 in this way allows dead space to be utilized even more effectively.

Part of the capacitor 133 may overlap the CMOS circuit board 111, or all of it may overlap the CMOS circuit board 111.

(E) The electrical contact 153 may be supported by the body mount 150. For example, the electrical contact 153 may be provided between the inner edge 150b and outer edge 150a of the body mount 150.

(F) The size of the body mount 150, the shutter unit 190, the diaphragm 113, the optical low-pass filter 112, the CMOS image sensor 110, the CMOS circuit board 111, the main circuit board 140, the display device 120, and other such parts in the up and down direction is not limited to the size relationship shown in FIG. 3. For example, as shown in FIG. 3, in the above embodiment the main circuit board 140 is larger than the display device 120 in the up and down direction, but it is also conceivable that the display device 120 will be larger than the main circuit board 140 in the up and down direction as a result of layout modifications or the like.

(G) The processing that was performed by the CMOS circuit board 111 in the above embodiment may instead be performed by the main circuit board 140. For instance, A/D conversion processing could be performed by the main circuit board 140 rather than by the CMOS circuit board 111. Also, part of the processing that was performed by the main circuit board 140 in the above embodiment may be performed by the CMOS circuit board.

(H) In the above embodiment the capacitor 133 mainly supplied power the flash device 130, but the capacitor 133 may instead supply power to parts other than the flash device 130.

(I) The battery 11 may be disposed between the capacitor 133 and the side face 160c of the housing member 160.

Also, something other than the battery 11 may be used as the power supply unit. For instance, the power supply unit may receive a supply of power from an external power supply via a power cord or the like, and then supply this power to the camera body 1.

What is claimed is:

1. A camera body to which a lens unit configured to form an optical image of a subject can be mounted, comprising:
a body mount to which the lens unit can be mounted;
an imaging element including a light receiving face arranged to receive light passing through the lens unit, and configured to convert an optical image of the subject into an electrical signal;
a capacitor disposed above the imaging element and more to the imaging element side than the body mount in a landscape orientation; and
a housing member accommodating the imaging element and the capacitor,
wherein when viewed in a second direction parallel to the light receiving face, at least part of the capacitor overlaps the imaging element.

2. The camera body according to claim 1, wherein,
when viewed in a first direction perpendicular to the light receiving face, at least part of the capacitor is disposed within a first region bounded by the outer edge of the body mount.

3. The camera body according to claim 2, wherein
the body mount is an annular member, and
when viewed in the first direction, at least part of the capacitor is disposed within a second region bounded by the inner edge of the body mount.

4. The camera body according to claim 3, wherein,
in the landscape orientation, the capacitor is disposed in a space bounded by the body mount, the imaging element, and the upper face of the housing member.

5. The camera body according to claim 4, further comprising
a display unit including a display screen configured to display the electrical signal as an image, and disposed on the opposite side of the imaging element from the body mount, wherein,
when viewed in a first direction perpendicular to the light receiving face, at least part of the capacitor overlaps the display unit.

6. The camera body according to claim 5, wherein,
when viewed in a first direction perpendicular to the light receiving face, at least part of the capacitor overlaps the display unit in a state in which the display screen is perpendicular to the first direction.

7. The camera body according to claim 5, wherein,
in the landscape orientation, the capacitor is disposed in a space bounded by the body mount, the imaging element, the upper face of the housing member, and the display unit.

8. The camera body according to claim 1, further comprising
an imaging element circuit board configured to control the imaging element and disposed on the opposite side of the imaging element from the body mount, wherein,
when viewed in a first direction perpendicular to the light receiving face, at least part of the capacitor overlaps the imaging element circuit board.

9. The camera body according to claim 8, wherein,
in the landscape orientation, the capacitor is disposed in a space bounded by the body mount, the imaging element, the upper face of the housing member, and the imaging element circuit board.

10. The camera body according to claim 1, wherein
the light receiving face is rectangular, and
the capacitor extends in the direction of the long side of the light receiving face.

11. The camera body according to claim 1, further comprising
a flash apparatus including a light emitter configured to emit flash light and a support member supporting the light emitter, and arranged to be stowed in the housing member, wherein,
in a state in which the flash apparatus is stowed in the housing member, the light emitter is disposed between the capacitor and the front face of the housing member.

12. The camera body according to claim 11, wherein
the flash apparatus further includes a rotary hinge rotatably connecting the support member and the housing member, and
the rotary hinge is disposed between the capacitor and the rear face of the housing member.

13. The camera body according to claim 1, wherein,
in the landscape orientation, the capacitor is disposed in a space bounded by the body mount, the imaging element, and the upper face of the housing member.

14. The camera body according to claim 1, further comprising
a display unit including a display screen configured to display the electrical signal as an image, and disposed on the opposite side of the imaging element from the body mount, wherein,
when viewed in a first direction perpendicular to the light receiving face, at least part of the capacitor overlaps the display unit.

15. An imaging device for acquiring an image of a subject, comprising:
a lens unit configured to form an optical image of a subject; and the camera body according to claim 1, to which the lens unit can be mounted.

16. A camera body to which a lens unit configured to form an optical image of a subject can be mounted, comprising:
- a body mount to which the lens unit can be mounted;
- an imaging element including a light receiving face arranged to receive light passing through the lens unit, and configured to convert an optical image of the subject into an electrical signal;
- a capacitor disposed above the imaging element and more to the imaging element side than the body mount in a landscape orientation;
- a housing member accommodating the imaging element and the capacitor; and
- a power supply unit configured to supply power to the various components of the camera body, wherein,
- when viewed in a first direction perpendicular to the light receiving face, the power supply unit is disposed between the capacitor and the side face of the housing member.

17. A camera body to which a lens unit configured to form an optical image of a subject can be mounted, comprising:
- a body mount to which the lens unit can be mounted;
- an imaging element including a light receiving face arranged to receive light passing through the lens unit, and configured to convert an optical image of the subject into an electrical signal;
- a capacitor disposed above the imaging element and more to the imaging element side than the body mount in a landscape orientation;
- a housing member accommodating the imaging element and the capacitor; and
- a display unit including a display screen configured to display the electrical signal as an image, and disposed on the opposite side of the imaging element from the body mount, wherein
- when viewed in a first direction perpendicular to the light receiving face, at least part of the capacitor overlaps the display unit in a state in which the display screen is perpendicular to the first direction.

18. The camera body according to claim 17, wherein, in the landscape orientation, the capacitor is disposed in a space bounded by the body mount, the imaging element, the upper face of the housing member, and the display unit.

\* \* \* \* \*